United States Patent
Takeuchi et al.

(10) Patent No.: US 6,734,890 B2
(45) Date of Patent: May 11, 2004

(54) SCANNING OPTICAL SYSTEM

(75) Inventors: Shuichi Takeuchi, Saitama-ken (JP); Daisuke Koreeda, Toyko (JP)

(73) Assignee: PENTAX Corporation, Tokyo (JP)

( * ) Notice: Subject to any disclaimer, the term of this patent is extended or adjusted under 35 U.S.C. 154(b) by 8 days.

(21) Appl. No.: 10/173,769

(22) Filed: Jun. 19, 2002

(65) Prior Publication Data
US 2003/0081108 A1 May 1, 2003

(30) Foreign Application Priority Data
Jun. 20, 2001 (JP) .................................... 2001-186887

(51) Int. Cl.$^7$ ............................................... G02B 26/08
(52) U.S. Cl. .......................................... 347/244; 359/205
(58) Field of Search ........................... 347/233, 244, 347/258, 259; 359/205, 206, 207, 433

(56) References Cited

U.S. PATENT DOCUMENTS

| | | | | |
|---|---|---|---|---|
| 4,731,623 A | * | 3/1988 | Oda et al. ................ | 347/137 |
| 5,784,094 A | * | 7/1998 | Ota et al. ................ | 347/243 |
| 5,995,267 A | * | 11/1999 | Paoli ....................... | 359/204 |
| 6,046,835 A | * | 4/2000 | Yamawaki et al. ....... | 359/205 |
| 6,219,168 B1 | * | 4/2001 | Wang ....................... | 359/216 |
| 6,304,282 B1 | * | 10/2001 | Fujimoto ................. | 347/242 |
| 6,473,105 B1 | * | 10/2002 | Tanaka et al. ............ | 347/118 |

FOREIGN PATENT DOCUMENTS

JP          11-64754          3/1999

* cited by examiner

Primary Examiner—Juanita Stephens
Assistant Examiner—Blaise Mouttet
(74) Attorney, Agent, or Firm—Greenblum & Bernstein, P.L.C.

(57) ABSTRACT

A scanning optical system that emits a plurality of beams to a plurality of surfaces to be scanned, respectively. The scanning optical system includes a light source and a polygonal mirror. The plurality of beams incident on the polygonal mirror are inclined with respect each other in an auxiliary scanning direction. The scanning optical system further includes an imaging optical system that converges the deflected beams on the plurality of surfaces, respectively. The imaging optical system includes a front lens group and a plurality of rear lens groups. All the beams are incident on the front lens group, and then incident on the respective rear lens groups. Each of the plurality of rear lens groups has a shape which is designed in accordance with an angle of a beam incident thereon with respect to an optical axis of the front lens group.

9 Claims, 12 Drawing Sheets

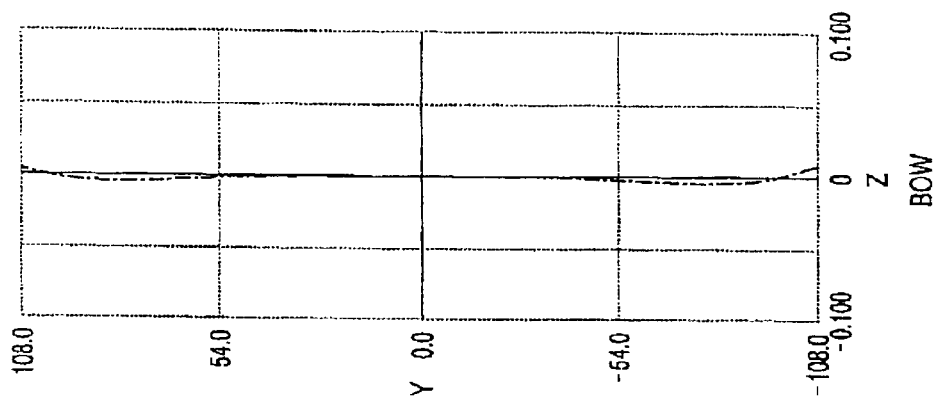
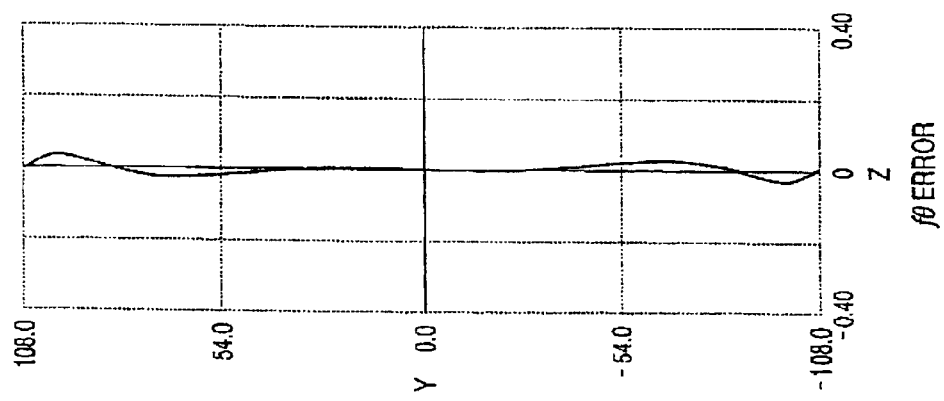

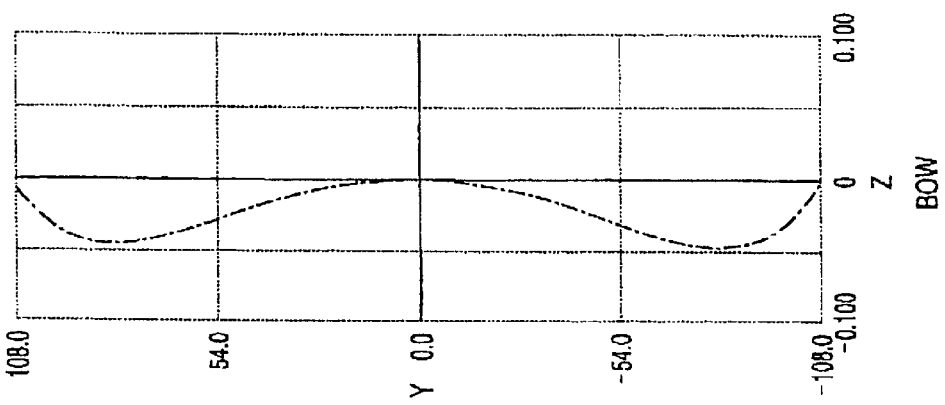
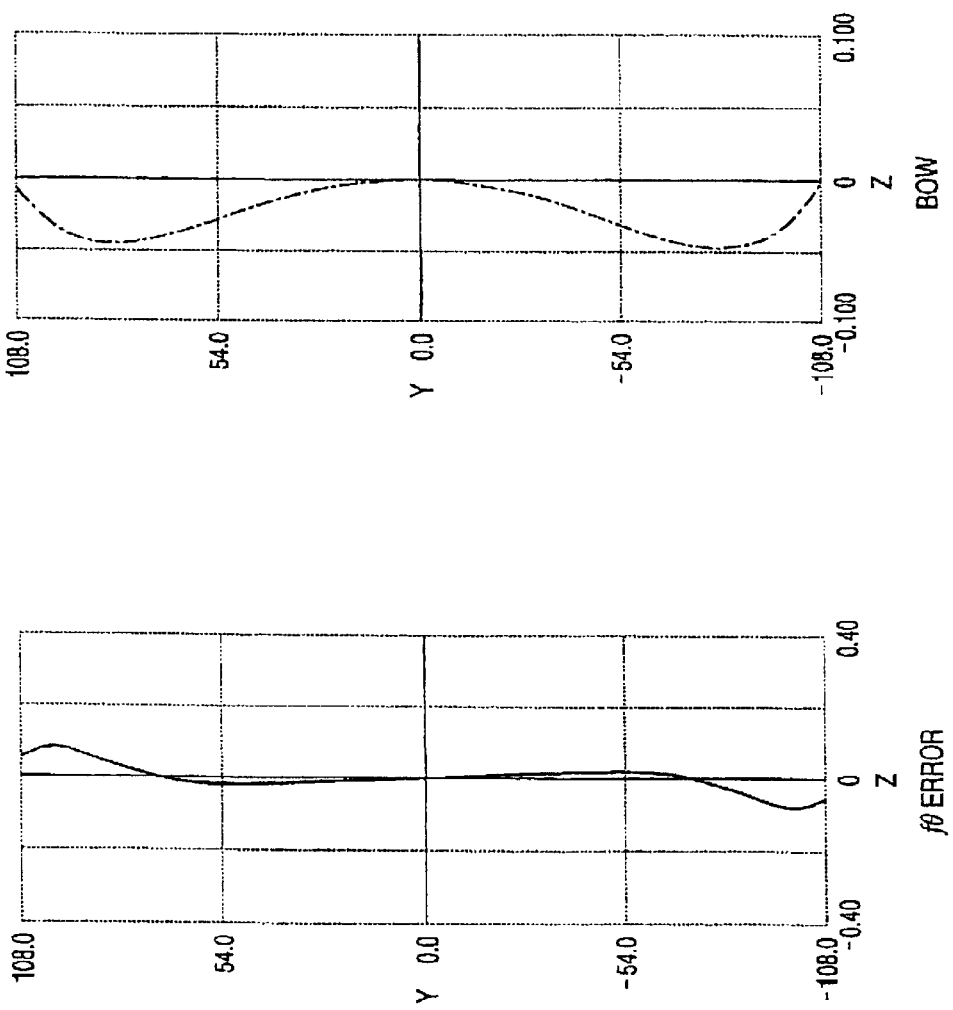

ized of the polygonal mirror, a motor for rotating the polygonal mirror should have sufficient power, which also increases the manufacturing cost of the entire optical system.

SCANNING OPTICAL SYSTEM

BACKGROUND OF THE INVENTION

The present invention relates to a scanning optical system employed, for example, in a color laser beam printer, color laser copier or the like.

Color printers have been developed and widely used for an output device of computers, color copiers or the like. In order to form a color image at a high speed, a color laser printer is widely employed. The color laser beam printer typically includes a plurality of photoconductive drums, and corona chargers, developing units etc. for respective color components, i.e., yellow (Y), magenta (M), cyan (C) and black (B).

In order to form electrostatic latent images consisting of the four color components on the photoconductive drums, respectively, four scanning optical systems, each of which has a polygonal mirror and imaging optical system, may be used. However, such an apparatus provided with four polygonal mirrors and four imaging optical systems for four photoconductive drums costs a lot in manufacturing thereof. Recently, an apparatus making use of a single polygonal mirror for simultaneously deflecting four beams corresponding to the four color components has been developed. The four deflected beams are incident on four imaging optical systems, respectively, thereby the four beams being directed to the four photoconductive drums. Thus, four image components can be formed simultaneously.

In order to simultaneously deflect a plurality of laser beams using a single polygonal mirror, in particular, to make a plurality of beams be incident on the plurality of imaging optical systems arranged separately in the auxiliary scanning direction, respectively, the beams should be inclined at different angles with respect to a plane perpendicular to a rotational axis of the polygonal mirror, or the beams are separated from each other in the auxiliary scanning direction.

If laser beams are inclined with respect to a plane perpendicular to the rotation axis of the polygonal mirror, the scanning lines, which are loci formed by moving beam spots on the surfaces to be scanned, curve in the auxiliary scanning direction. By displacing one of the lenses of the imaging lens, which has a power to converge a beam in the auxiliary scanning direction and is arranged at a position closer to the surface to be scanned than the other lenses, in the auxiliary scanning direction with respect to the beams incident on the lens, the curvature of the scanning lines in the auxiliary scanning direction, or a bow can be suppressed by a certain degree. However, the displacing amount varies depending on the incident angle of the beams with respect to the polygonal mirror. Therefore, such a lens should be formed to have a relatively wide effective area, which makes it very difficult to manufacture the lens. Further, in the above-described optical system, four of such lenses are required, which increases the manufacturing cost of the scanning optical system.

If a plurality of laser beams, which are separately arranged in the auxiliary scanning direction, are perpendicularly incident on the reflection surface of the polygonal mirror, the laser beams can be directed to proceed in parallel with the optical axes of the imaging optical systems, respectively, and therefore, the curvature in the auxiliary scanning direction can be prevented. However, in such a configuration, the size of the polygonal mirror in the auxiliary scanning direction should be increased. Further, due to

SUMMARY OF THE INVENTION

The present invention is advantageous in that, a scanning optical system is provided, in which a plurality of beams incident on a single polygonal mirror are inclined with respect to a plane perpendicular to the rotation axis of the polygonal mirror, and the bow of the scanning lines can be well suppressed using inexpensive lenses.

According to the present invention, there is provided a scanning optical system that emits a plurality of beams to a plurality of surfaces to be scanned, respectively. The scanning optical system includes a light source and a polygonal mirror. The plurality of beams incident on the polygonal mirror are inclined with respect to each other in an auxiliary scanning direction. The scanning optical system further includes an imaging optical system that converges the deflected beams on the plurality of surfaces, respectively. The imaging optical system includes a front lens group and a plurality of rear lens groups. All the beams are incident on the front lens group, and then incident on the respective rear lens groups. Each of the plurality of rear lens groups has a shape which is designed in accordance with an angle of a beam incident thereon with respect to an optical axis of the front lens group.

With this configuration, each of the rear lens groups needs not be formed to have a wide effective width in the auxiliary scanning direction, and therefore the manufacturing cost can be suppressed.

Optionally, each of the plurality of rear lens groups has at least one refraction surface which is expressed by a predetermined mathematical expression, each of the plurality of rear lens groups being configured such that a reference axis of the at least one refraction surface is displaced with respect to a center of a shape of the at least one refraction surface so that shifting amounts of positions where the beams incident on the at least one refraction surfaces of the plurality of rear lens groups with respect to the reference axes of the refraction surfaces are different from each other.

Further, the plurality of rear lens groups are configured such that the shifting amounts are greater as the angles of the incident beams with respect to the front lens group are greater, respectively.

Alternatively, each of the plurality of rear lens groups has at least one refraction surface, the at least one refraction surfaces of the plurality of rear lens groups being expressed by different mathematical expressions which are determined in accordance with angles of the incident beams with respect to an optical axis of the front lens group, respectively.

Preferably, the plurality of beams incident on the polygonal mirror intersect with each other at a point in the vicinity of a reflection surface of the polygonal mirror.

In this case, the front lens group may be arranged such that an optical axis thereof is parallel with a plane perpendicular to a rotation axis of the polygonal mirror, the optical axis of the front lens group passing the point at which the plurality of beams intersect with each other, each of refraction surfaces of the front lens group being symmetrical with respect to a main scanning plane which is a plane including the optical axis of the front lens group and perpendicular to the rotation axis of the polygonal mirror.

In a particular case, the plurality of laser beams may include first and second laser beams, which are inclined with respect to the main scanning plane on one side thereof at different angles, and third and fourth laser beams, which are inclined with respect to the main scanning plane on the other side thereof at different angles. Angles at which the first and fourth laser beams incline with respect to the main scanning plane may have the same absolute values, and angles at which the second and third laser beams incline with respect to the main scanning plane may have the same absolute values.

Optionally, two of the plurality of rear lens groups on which the first and fourth laser beams are incident may have the same shapes.

Further, two of the plurality of rear lens groups on which the second and third laser beams are incident may also have the same shapes.

Optionally, each of the plurality of laser beams incident on the polygonal mirror may be inclined with respect to the optical axis of the front lens group when projected on the main scanning plane.

Still optionally, all the plurality of rear lens groups may have different shapes.

Further optionally, each of the plurality of rear lens groups may be an anamorphic optical system having a stronger positive power in the auxiliary scanning direction than in the main scanning direction.

BRIEF DESCRIPTION OF THE ACCOMPANYING DRAWINGS

Figure 3:
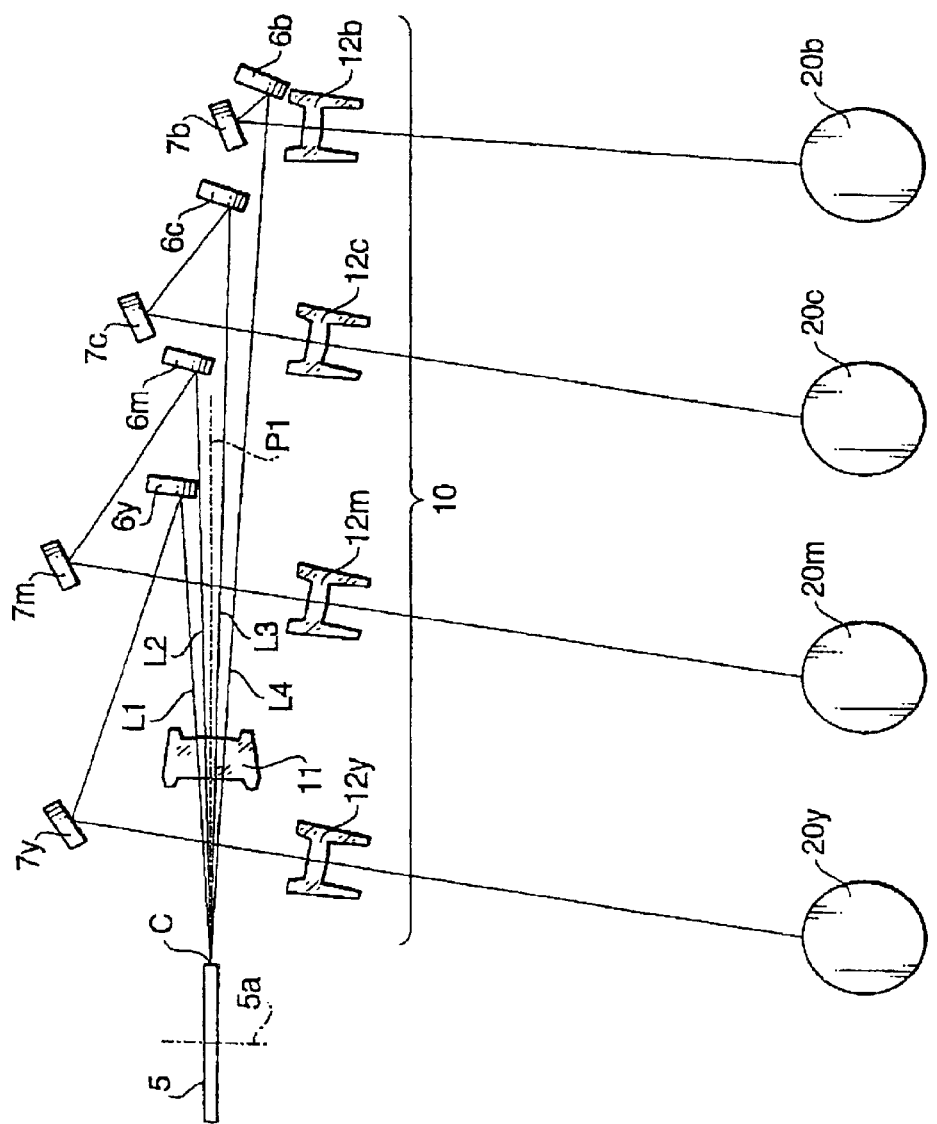
Figure 4:
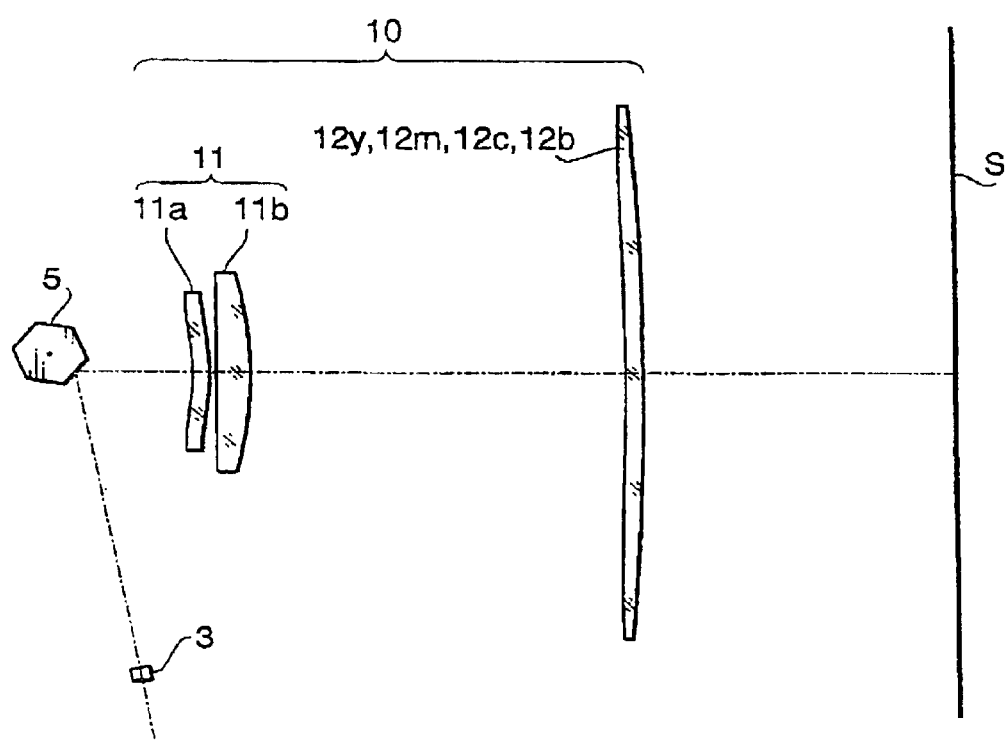
Figure 5:
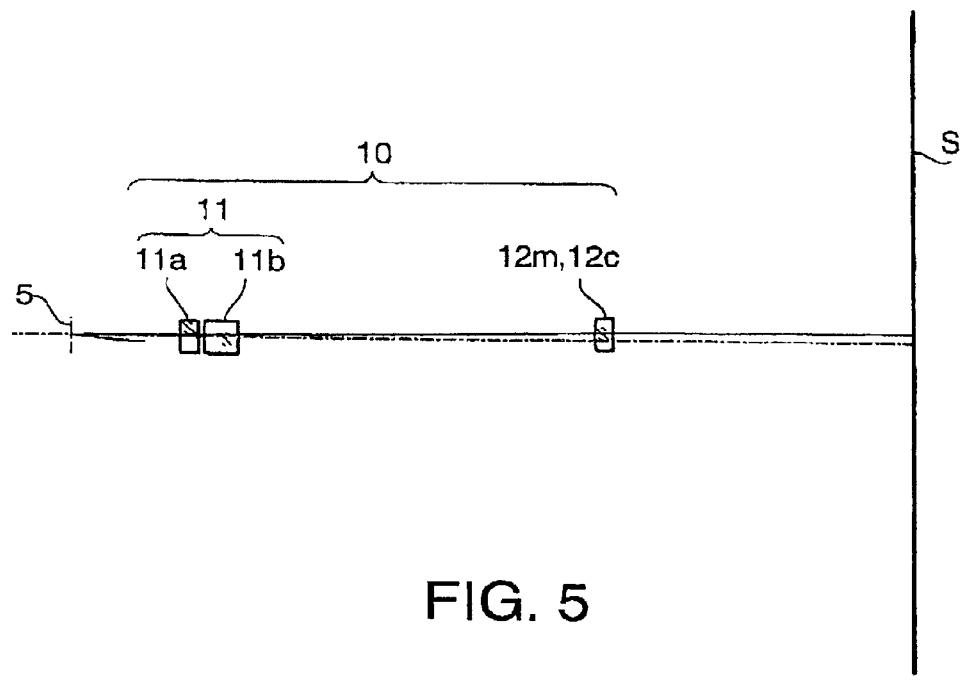
Figure 6:
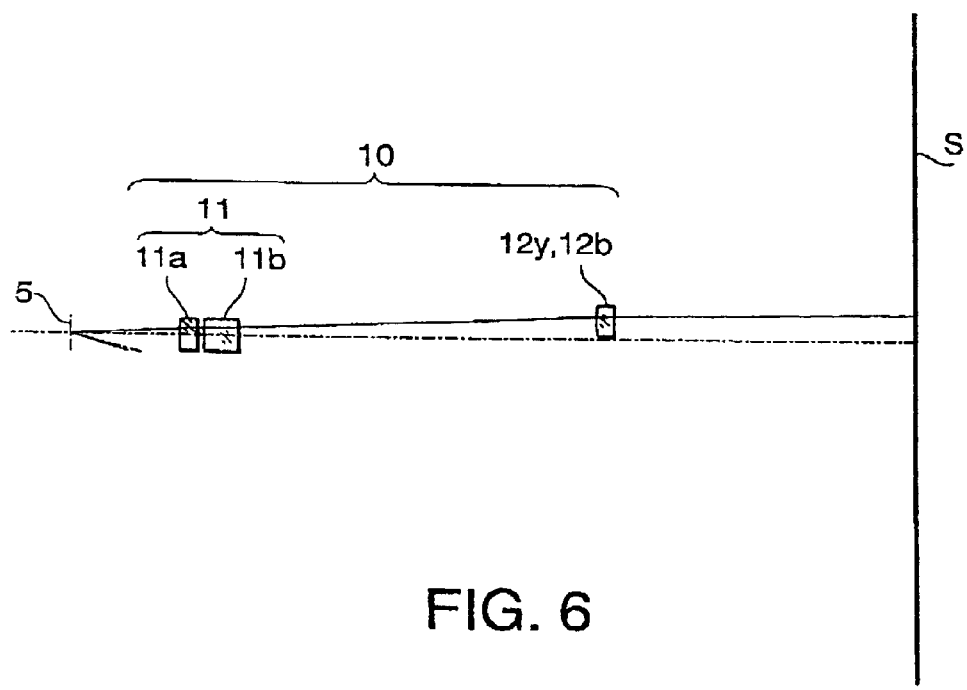
Figure 8B:
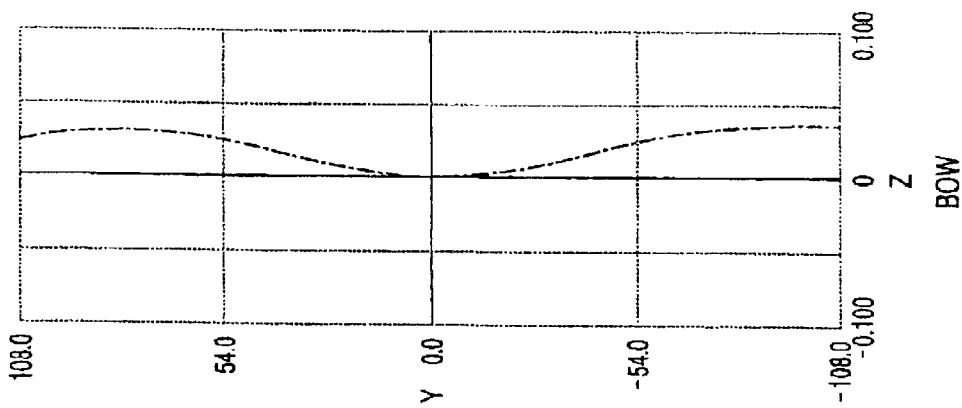
Figure 8A:
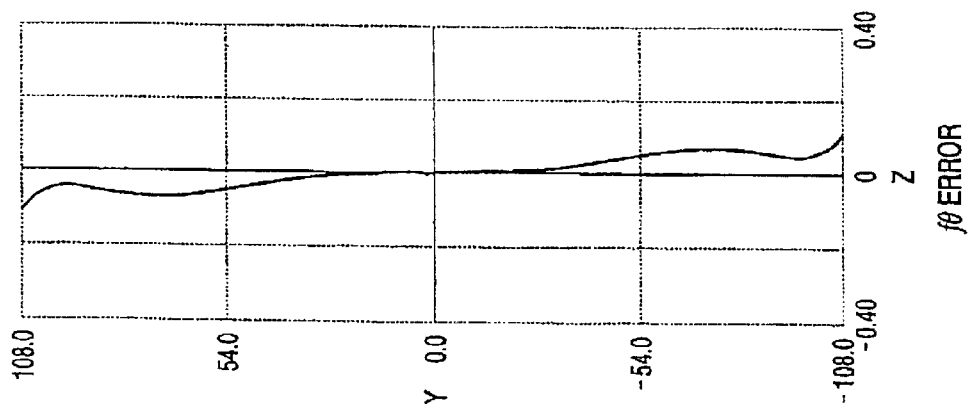
Figure 9:
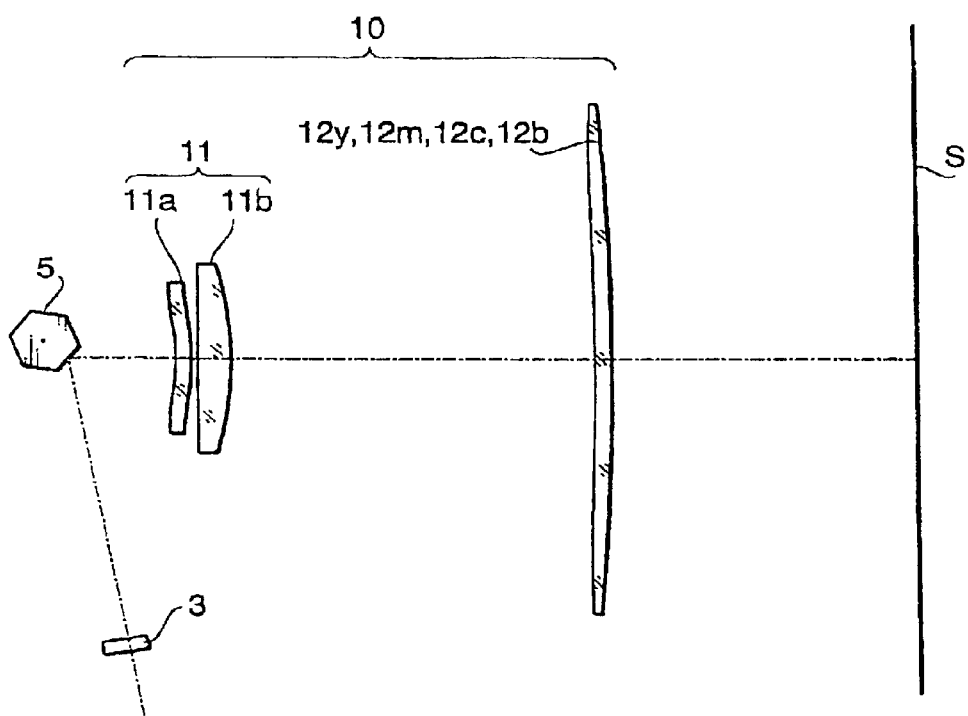
Figure 10:
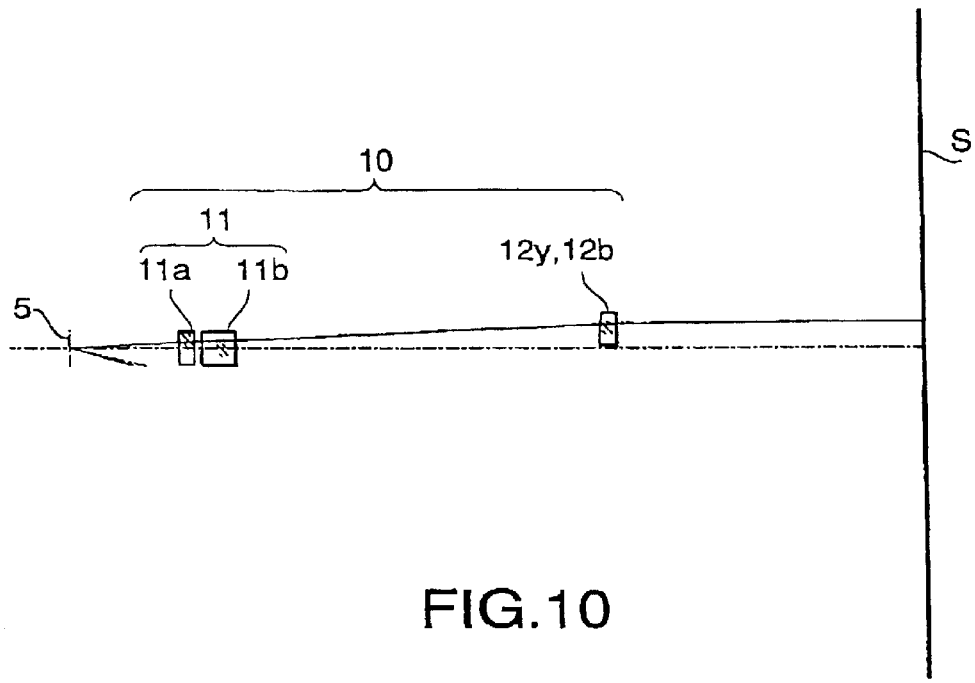
Figure 11:
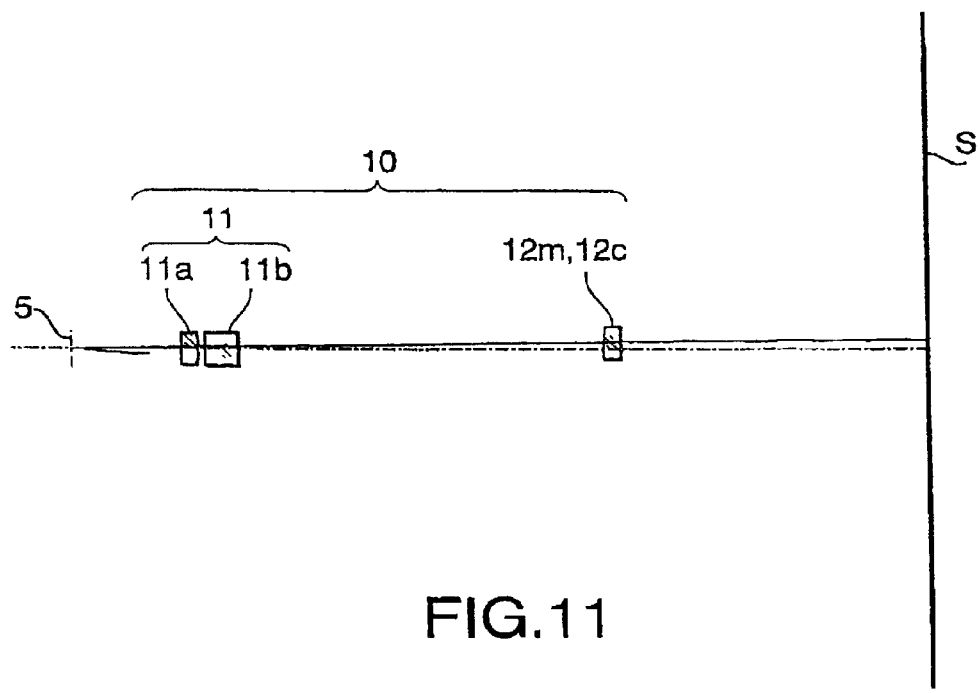
Figure 12B:
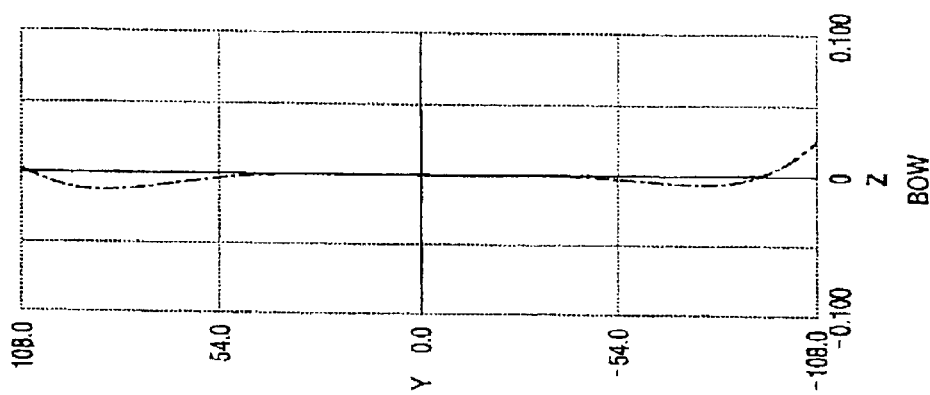
Figure 12A:
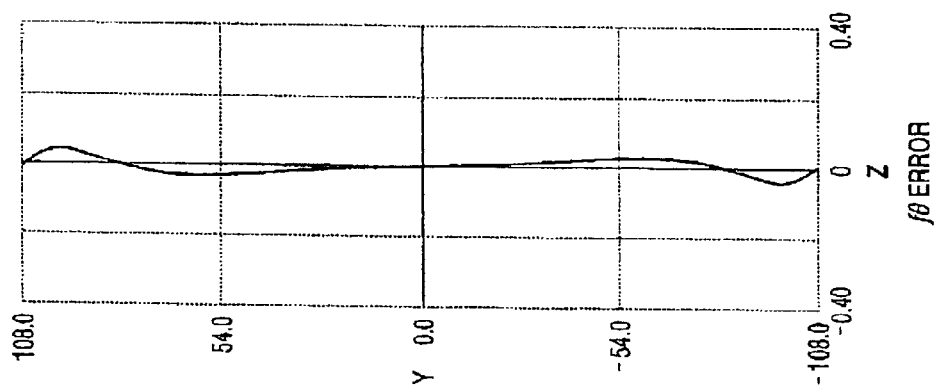
Figure 14A:
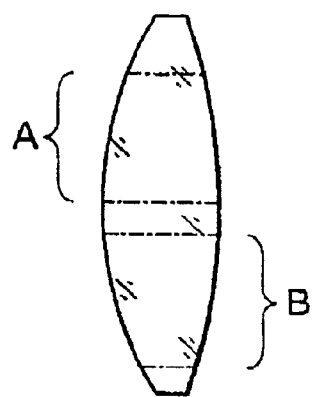
Figure 14B:
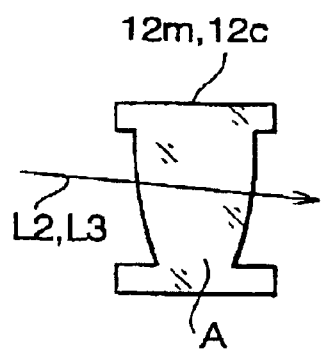
Figure 14C:
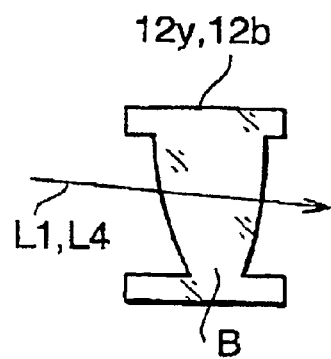

FIG. 3 schematically shows a side view of the scanning optical system;

FIG. 4 shows a developed view of a scanning system along the main scanning direction, according to a first embodiment;

FIG. 5 shows an optical path, according to the first embodiment, closer to a main scanning plane;

FIG. 6 shows an optical path, according to the first embodiment, farther from the main scanning plane;

FIGS. 7A and 7B are graphs showing fθ error and bow for the beam closer to the main scanning plane according to the first embodiment;

FIGS. 8A and 8B are graphs showing fθ error and bow for the beam farther from the main scanning plane according to the first embodiment;

FIG. 9 shows a developed view of a scanning system along the main scanning direction, according to a second embodiment;

FIG. 10 shows an optical path, according to the second embodiment, closer to a main scanning plane;

FIG. 11 shows an optical path, according to the second embodiment, farther from the main scanning plane;

FIGS. 12A and 12B are graphs showing f error and bow for the beam closer to the main scanning plane according to the second embodiment;

FIGS. 13A and 13B are graphs showing fθ error and bow for the beam farther from the main scanning plane according to the second embodiment; and FIGS. 14A–14C illustrate shapes of lenses of a rear lens group.

DESCRIPTION OF THE EMBODIMENTS

Hereinafter, embodiments of the invention will be described with reference to the accompanying drawings.

A scanning optical system according to the present invention is configured to deflect a plurality of laser beams simultaneously, thereby a plurality of scanning lines are formed simultaneously on the same number of surfaces to be scanned, respectively. In particular, the scanning optical system is applicable to a color laser beam printer, in which yellow, magenta, cyan and black toner images are sequentially transferred on a sheet of paper while it is being fed so that a color image is printed quickly.

Figure 1:
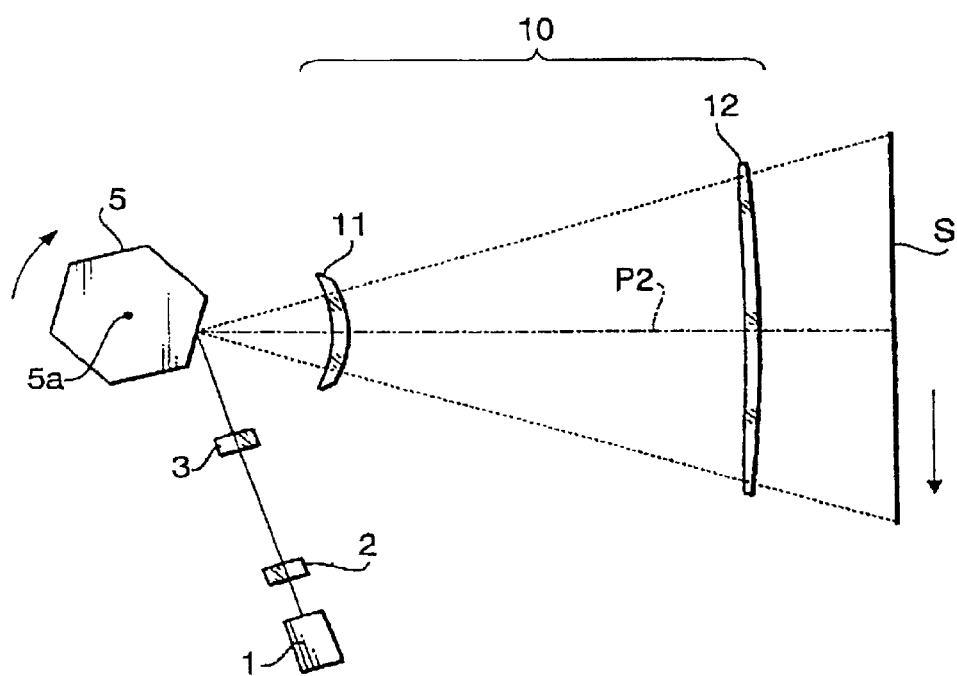
FIG. 1 shows an optical structure of a scanning optical device along a main scanning direction to which embodiments of the invention are applicable.
Figure 2:
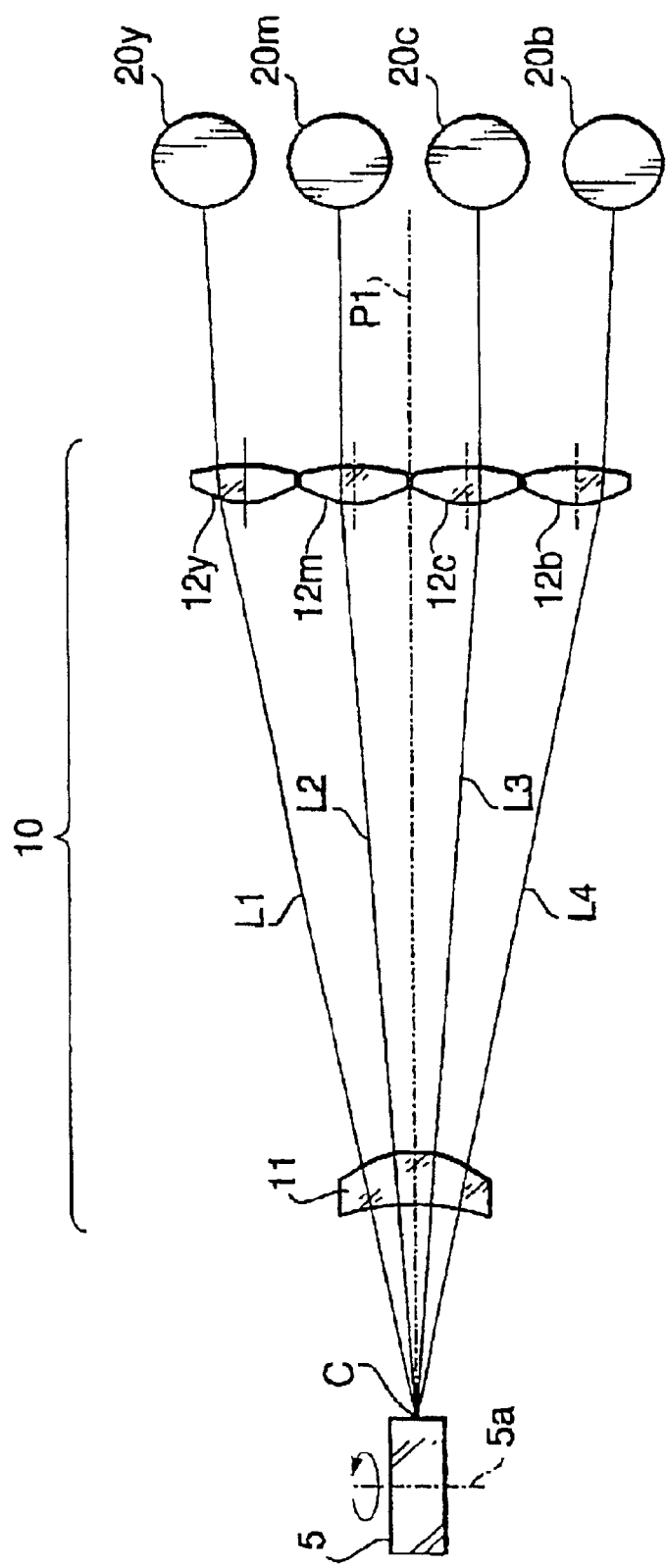
FIG. 2 shows the optical structure of the scanning optical system along an auxiliary scanning direction.

It should be noted that, according to the embodiments, in order to downsize the color printer, optical paths of the four beams are bent using mirrors, respectively as shown in FIG. 3. In FIGS. 1 and 2, for the sake of simplification of description, the mirrors are omitted and developed optical paths are indicated.

FIG. 1 shows a developed view of the scanning optical system to which the embodiments of the invention are applicable. As shown in FIG. 1, the scanning optical system includes a laser source 1, a collimating lens 2, a cylindrical lens 3, a polygonal mirror 5, and an imaging optical system 10 which converges beams deflected by the polygonal mirror 5. The imaging optical system 10 includes a front lens group 11 and a rear lens group 12.

In this specification, a direction in which a beam spot scans on a surface to be scanned is referred to as a main scanning direction, and a direction perpendicular to the main scanning direction is referred to as an auxiliary scanning direction. The main and auxiliary scanning directions are referred to when an optical element is described with reference to the directions. Further, a plane perpendicular to the rotation axis of the polygonal mirror and including the optical axis of the front lens group will be referred to as a main scanning plane, and a plane including the optical axis of the front lens group and perpendicular to the main scanning plane will be referred to as an auxiliary scanning plane.

The laser beams emitted by the laser source 1 are collimated by the collimating lens 2, and pass through the cylindrical lens 3. The beams are incident on the polygonal mirror 5, which rotates about its rotation axis 5a, and deflected. Each of the deflected laser beams passes through the imaging optical system 10 and is converged on surfaces S to be scanned to form a beam spot which moves in the main scanning direction at a constant speed.

It should be noted that, in the main scanning direction, a beam collimated by the collimating lens 2 is reflected by the polygonal mirror and travels as a collimated beam. Then, by the converging power of the imaging lens 10, the beam is converged on the surface S to be scanned. In the auxiliary scanning direction (i.e., the direction perpendicular to a surface of FIG. 1), the beam is once converged, by the cylindrical lens 3, on a plane located in the vicinity of the reflection surface of the polygonal mirror, incident on the imaging lens 10 as a diverging beam, and then converged on the surface S by the converging power of the imaging lens 10. Since the reflection surface of the polygonal mirror and the surface S to be scanned have a conjugate relationship, in the auxiliary scanning direction, tilt of the reflection surface of the polygonal mirror 5 (i.e., a so-called facet error) can be compensated for, and thus, a positional error in the auxiliary scanning direction due to the facet error is avoidable. With this configuration, a beam reflected by any one of the reflection surfaces of the polygonal mirror 5 scans on the same scanning line on the surface S to be scanned.

The imaging optical system 10 includes the front lens group 11 which is closer to the polygonal mirror 5, and the rear lens group 12 which is closer to the surface S to be scanned. The front lens group 11 has a power which converges the beam passed therethrough mainly in the main scanning direction. The rear lens group 12 has a power which converges the beam passed therethrough mainly in the auxiliary scanning direction, and further functions to compensate for curvature of fields in the main scanning direction, aberrations and fθ errors.

The scanning optical system according to the invention is configured such that the optical structure shown in FIG. 1 is arranged on four levels in the auxiliary scanning direction, respectively corresponding to yellow (Y), magenta (M), cyan (C) and black (B) color components. As shown in FIG. 2, four photoconductive drums 20y, 20m, 20c and 20b for the above four components are provided, and four scanning lines are formed on the scanning surfaces of the four photoconductive drums 20y, 20m, 20c and 20b, simultaneously. It should be noted that, as shown in FIG. 2, in an actual configuration, a single polygonal mirror 5 and a single front lens group 11 are used for all the beams L1–L4, while four rear lens groups 12y, 12m, 12c and 12b are provided for the four color components.

In the main scanning plane, the four beams L1–L4 proceed along lines which form the same angle with respect to the optical axis of the front lens group 11. In the auxiliary scanning plane, the four beams L1–L4 intersect with each other at a point C in the vicinity of the reflection surface of the polygonal mirror 5. The point C is on the optical axis of the front lens group 11.

Specifically, the beams L1 and L2 proceed on one side with respect to the main scanning plane P1, and are directed to the point C at different incident angles in the auxiliary scanning direction. The beams L3 and L4 proceed on the other side with respect to the main scanning plane P1, and are directed to the point C at different incident angles in the auxiliary scanning direction. The angles the beams L2 and L3 form with respect to the main scanning plane P1 have the same absolute value, and the angles the beams L1 and L4 form with respect to the main scanning plane P1 have the same absolute value. The paths of the four beams L1–L4 are gradually separated from the main scanning plane P1 after the beams are reflected by the reflection surface of the polygonal mirror 5.

Since the four beams L1–L4 pass through the front lens group 11, it is designed to have a sufficient width in the auxiliary scanning direction as schematically shown in FIG. 2.

The rear lens groups 12y, 12m, 12c and 12b are arranged such that the reference axes thereof are shifted, with respect to the optical axis of the front lens group 11, in the auxiliary scanning direction. The shifting amounts of the lens groups 12y, 12m, 12c and 12b are determined such that the four beams L1–L4 are incident at predetermined positions which are shifted from the reference axes in the auxiliary scanning direction by predetermined amounts, respectively, as shown in FIG. 2. The reference axes of the rear lens groups 12y, 12m, 12c and 12b are defined as axes passing through origins when the surfaces of the rear lens groups 12y, 12m, 12c and 12b are expressed by equations, respectively.

The shifting amount of the lens groups 12y, 12m, 12c and 12b (i.e., distances between the reference axes thereof and points at which the beams L1–L4 are incident) are determined such that the bow in the auxiliary scanning direction caused by the differences of the incident points of the beams L1–L4 with respect to the reference axes cancel the bow caused by the inclination of the beams with respect to the main scanning plane P1. As shown in FIG. 2, the reference axes are located closer than the points on which the beams L1–L4 are incident to the optical axis of the front lens group 11. The shifting amounts are determined based on the optical characteristics of the lens groups 11 and 12, a distance between the front lens group 11 and the point C, and, if a distance between the front lens group 11 and the rear lens group 12 are fixed, the angles at which the beams L1–L4 are inclined with respect to the main scanning plane P1, respectively.

It should be noted that if the front lens 11 is configured to be symmetrical with respect to the main scanning plane P1, degree of curvatures of scanning lines formed by the beams incident on the front lens group 11 at the same angles with respect to the main scanning plain P1 are the same. Therefore, according to the embodiment shown in FIG. 2, the shifting amounts of the rear lens groups 12y and 12b are the same, and the shifting amounts of the rear lens groups 12m and 12c are the same.

Further, since the inclination angles of the beams L1 and L4 with respect to the main scanning plain P1 are greater than those of the beams L2 and L3, the degree of curvatures of the scanning lines of the beams L1 and L4 is greater than that of the beams L2 and L3. Therefore, the shifting amounts of the rear lens groups 12y and 12b are greater than those of the rear lens groups 12m and 12c.

The shape of the rear lens groups 12y, 12m, 12c and 12b are individually designed in accordance with the angles of the incident beams with respect to the main scanning plane P1 so as to achieve an appropriate effect of canceling aberrations. In this embodiment, the absolute values of the angles of the beams L1 and L4 incident on the rear lens groups 12y and 12b are the same, and the absolute values of the angles of the beams L2 and L3 incident on the rear lens groups 12m and 12c are the same. Therefore, the rear lens groups 12y and 12b are configured such that the shapes thereof in the main scanning direction are symmetrical with respect to the auxiliary scanning plane, and that the rear lens groups 12y and 12b are arranged symmetrically with respect to the main scanning plane P1. Similarly, the rear lens groups 12m and 12c are configured such that the shapes thereof in the main scanning direction are symmetrical with respect to the auxiliary scanning plane, and that the rear lens groups 12m and 12c are arranged symmetrically with respect to the main scanning plane P1. The shape of each of the rear lens groups 12y, 12m, 12c and 12b in the auxiliary scanning direction is asymmetrical.

In the foregoing description, the scanning optical system is described such that the optical paths are developed. Practically, the optical paths of the beams L1–L4 are bent using mirrors as shown in FIG. 3. That is, four rear lens groups 12y, 12m, 12c and 12b are arranged at a predetermined interval on a line which is shifted toward the photoconductive drums 20y, 20m, 20c and 20b with respect to the optical axis of the first lens group 11.

In the optical paths of the beams L1–L4, between the front lens group 11 and each of the rear lens groups 12y, 12m, 12c and 12b, a pair of mirrors 6y and 7y, 6m and 7m, 6c and 7c, and 6b and 7b are inserted so that the beams L1–L4 passed through the front lens group 11 are incident on the rear lens groups 12, 12m, 12c and 12b, respectively. The beams L1–L4 passed through the front lens group 11 are reflected by the mirrors 6y, 6m, 6c and 6b, and then, by mirrors 7y, 7m, 7c and 7b and incident on the rear lens groups 12y, 12m, 12c and 12b, respectively. Thus, the beams L1–L4 reflected by the mirrors 7y, 7m, 7c and 7b intersect the optical paths thereof, respectively.

Distances from the light emitting surfaces of the rear lens groups 12y, 12m, 12c and 12b to the corresponding photoconductive drums 20y, 20m, 20c and 20b are substantially the same. The photoconductive drums 20y, 20m, 20c and 20b have the same cylindrical shape, with their rotation axes extended in the main scanning direction. The photoconductive drums 20y, 20m, 20c and 20b are arranged as equally spaced from each other in the direction parallel to the optical axis of the front lens group 11. It should be noted that the locations of the mirrors 6y, 6m, 6c, 6b, 7y, 7m, 7c and 7b, the rear lens groups 12y, 12m, 12c and 12b, and the photoconductive drums 20y, 20m, 20c and 20b are determined such that the optical path lengths are the same.

Hereinafter, three concrete embodiments will be described.

First Embodiment

According to the first embodiment, the rear lens groups 12m and 12c are single lens elements having refraction surfaces designed to compensate for aberrations for the beams L2 and L3, respectively. The rear lens groups 12y and 12b are configured to have refraction surfaces which are expressed by the same equation for the rear lens groups 12m and 12c, but distances between the reference axes thereof and the centers of the lens shapes are changed, respectively.

FIG. 4 shows a developed view of the scanning system along the main scanning direction, according to the first embodiment. FIGS. 5 and 6 show optical paths of beams in the auxiliary scanning direction.

In FIG. 4, an optical path corresponding to each of the beams L1–L4, from the cylindrical lens 3 to a surface S to be scanned along the main scanning plane, is shown. In FIG. 5, an optical path corresponding to the beam L2 (or L3) along the auxiliary scanning plane is shown. It should be noted that the optical paths of the beams L2 and L3 are symmetrical with respect to the main scanning plane P1. Therefore, one optical path is indicated in FIG. 5 and the other is omitted. In FIG. 6, an optical path corresponding to the beam L1 (or L4) along the auxiliary scanning plane is shown. It should be noted that the optical paths of the beams L1 and L4 are symmetrical with respect to the main scanning plane P1. Therefore, one optical path is indicated in FIG. 6 and the other is omitted. In these figures, the mirrors 6 (6y, 6m, 6c and 6b) and 7 (7y, 7m, 7c and 7b) are omitted and the optical paths from the front lens group 11 to the rear lens groups 12y, 12m, 12c and 12b are indicated as developed.

The front lens group 11 includes first and second lenses 11a and 11b. The first lens 11a is configured such that both refraction surfaces are rotationally symmetrical aspherical surfaces. The second lens 11b is configured such that the light incident surface is a planar surface, and the light emitting surface is a spherical surface. Each of the rear lens groups 12y, 12m, 12c and 12b consists of a single lens, of which the light incident surface Is a rotationally asymmetrical aspherical surface and the light emitting surface is a spherical surface. Since each of the rear lens groups 12y, 12m, 12c and 12b consists of a single lens element, they will be referred to as rear lens 12y, 12m, 12c and 12b.

The rotationally asymmetrical aspherical surface of each of the rear lenses 12m and 12c is expressed by a SAG amount, which represents a distance from a reference plane tangential to the surface. The SAG amount is defined by a polynomial having two-dimensional coordinates, on the reference plane, as its variables. The reference axis of the rear lens group, which was mentioned above, is the axis passing through the origin of the two-dimensional coordinates. The rotationally asymmetrical aspherical surfaces which are beam incident side surfaces of the rear lenses 12y and 12b are defined by the polynomial similar to that defining those of rear lenses 12m and 12c, and distances of the reference axes thereof with respect to the centers of the shapes of the lenses are different from those for the rear lenses 12m and 12c.

Table 1 shows numerical structure of the scanning optical system shown in FIGS. 4–6. In Table 1, a symbol a represents angles, with respect to the optical axis of the front lens group 11, of the laser beams L1–L4 incident on the polygonal mirror 5 when projected on a main scanning plain P1. A symbol β1 represents angles (absolute value), with respect to the optical axis of the front lens group 11, of the laser beams L2 and L3 incident on the polygonal mirror 5 when projected on an auxiliary scanning plain P2. A symbol β2 represents angles (absolute value), with respect to the optical axis of the front lens group 11, of the laser beams L1 and L4 incident on the polygonal mirror 5 when projected on an auxiliary scanning plain P2. A symbol r represents a paraxial radius (unit: mm) of the lens surface, d represents a distance between the surface and a next downstream side surface (unit: mm), and n represents a refractive index at a design wavelength (i.e., 780 nm). The displacing amount Ld represents the distance between the reference axis of the rear lens and the optical axis of the front lens group in the auxiliary scanning direction (unit: mm), and shifting amount is a distance between the center of the rear lens and the reference axis of the rear lens in the auxiliary scanning direction (unit: mm). In the indication of the shifting amount, distance d, and displacing amount Ld, IN represents the value corresponding to the laser beams L2 and L3, while OUT represents the value corresponding to the laser beams L1 and L4. The focal length of the entire scanning optical system is 200 mm, a half the field of angle for scanning the effective scanning width on the surface S to be scanned is 30.9°, and a distance from a deflection reference point (which is a point coinciding with the front focal point of the front lens group 11 and at which a beam incident on the polygonal mirror 5 is deflected to proceed along the auxiliary scanning plane P2) and surface #1 (the beam incident surface of the first lens group 11) is 33.0 mm.

TABLE 1

| Surface | r | d (IN/OUT) | n | Ld (IN/OUT) |
|---|---|---|---|---|
| #1 | −72.40 | 5.0 | 1.4862 | — |
| #2 | −66.00 | 2.0 | — | — |
| #3 | inf. | 10.0 | 1.5107 | — |
| #4 | −121.40 | 108.0/110.4 | — | — |
| #5 | −756.70 | 5.0 | 1.4862 | 2.11/6.22 |
| #6 | −1045.70 | — | — | — |

α = 80°
β1 = 1.15°
β2 = 3.46°
Shifting amount (IN) = 0.6
Shifting amount (OUT) = 2.0

In Table 1, surfaces #1 and #2 are the surfaces of the first lens 11a, and surfaces #3 and #4 are the surfaces of the second lens 11b of the front lens group 11. Surfaces #5 and #6 represents the rear lens 12. The radius r of surface #5 represents that on the reference axis.

As afore-mentioned, surfaces #1 and #2 are rotational symmetrical aspherical surfaces, which are expressed by SAG amount X(h) representing a distance from a point, whose height with respect to the optical axis is h, on the surface to a plane tangential to the surface at the optical axis thereof. The SAG amount X(h) is given by equation (1) below.

$$X(h) = \frac{Ch^2}{1 + \sqrt{1 - (\kappa + 1)C^2 h^2}} + A_4 h^4 + A_6 h^6 + A_8 h^8 \quad (1)$$

In the equation (1), C represents a curvature on the optical axis of the aspherical surface (i.e., C=1/r), κ represents a conical coefficient, and $A_4$, $A_6$, $A_8$ represent fourth, sixth and eighth aspherical coefficients. The values of the conical coefficient K and the aspherical coefficients $A_4$, $A_6$, $A_8$ are shown in TABLE 2.

TABLE 2

| Surface | κ | $A_4$ | $A_6$ | $A_8$ |
|---|---|---|---|---|
| #1 | 0.000 | $6.657 \times 10^{-6}$ | $6.491 \times 10^{-11}$ | $0.000 \times 10^0$ |
| #2 | 0.000 | $5.582 \times 10^{-6}$ | $6.714 \times 10^{-11}$ | $0.000 \times 10^0$ |

Surface #5 is expressed by SAG amount X(Y, Z) representing a distance from a point, whose two-dimensional coordinates are Y (main scanning direction) and Z (auxiliary scanning direction), on the surface to a reference plane tangential to the surface. It should be noted that a point where a reference axis, which is perpendicular to the reference plane, intersects with the reference plane is defined as the origin of the two-dimensional coordinates. Specifically, surface #5 is a rotationally asymmetrical aspherical surface expressed by the SAG amount X(Y, Z) as defined by equation (2), Y being the height, in the main scanning direction, of a point on the reference plane, Z being the height in the auxiliary scanning direction, of the point on the reference plain.

$$X(Y, Z) = \frac{(Y^2 + Z^2)}{r\left(1 + \sqrt{1 - \frac{(\kappa+1)(Y^2+Z^2)}{r^2}}\right)} + \sum\sum B(m, n) Y^m Z^n \quad (2)$$

In the equation (2), r represents a radius of curvature on the reference axis, κ represents a conical coefficient, and B(m,n) represents aspherical coefficients. The values of the aspherical coefficients are shown in TABLE 3. The conical coefficient K of the surface #5 is 0.000.

for those including the first order component are zero (i.e., B(m, n)=0 for n=3, 5, . . . ). Since B (m, 1) is not zero for m=0, 2 and 4, the surface #5 is inclined with respect to the auxiliary scanning direction. In TABLE 3, coefficients of odd order terms except for n=1 are omitted.

FIGS. 7A and 7B are graphs showing characteristics of the scanning optical system according to the first embodiment for the laser beams L2 and L3. FIG. 7A shows an fθ error (i.e., displacement of the beam spot with respect a designed position), and FIG. 7B shows the bow (displacement of the spot position in the auxiliary scanning direction). In each graph, the vertical axis (y axis) represents the image height (i.e., a distance from the center of the scanning width on the photoconductive drum in the main scanning direction), and the horizontal axis (z axis) represents the quantity of the aberration. The unit is mm (millimeter) in each axis. The rear lenses 12m and 12c for the laser beams L2 and L3 are designed such that the scanning lines formed by the laser beams L2 and L3, which travel the paths closer to the main scanning plane P1, are appropriately compensated. Therefore, as shown in FIGS. 7A and 7B, the aberrations are well compensated for.

The rear lenses 12y and 12b have the same refraction surfaces as those of the rear lenses 12m and 12c. However, the shift amount of the reference axis with respect to the center of the lens is different. Therefore, the rear lenses 12y and 12b function differently from the rear lenses 12m and 12c for a beam incident on the same position.

FIGS. 8A and 8B show the fθ error and the bow, respectively. As shown in FIGS. 8A and 8B, the aberrations corresponding to the laser beams L1 and L4 are well compensated for.

Second Embodiment

According to the second embodiment, the rear lens groups 12y and 12b are configured to have refraction surfaces which can compensate for aberrations corresponding to the laser beams L1 and L4. The rear lens groups 12m and 12c are configured to have refraction surfaces which are expressed by the same equation for the rear lens groups 12y and 12b, but distances between the reference axes thereof and the centers of the lens shapes are changed, respectively. Similarly to the first embodiment, each of the rear lens groups 12y, 12m, 12c and 12b consists of a single lens element.

FIG. 9 shows a developed view of the scanning system along the main scanning direction, according to the second embodiment. FIGS. 10 and 11 show optical paths of beams in the auxiliary scanning direction.

In FIG. 9, an optical path corresponding to each of the beams L1–L4, from the cylindrical lens 3 to a surface S to

TABLE 3

| | n | | | | |
|---|---|---|---|---|---|
| m | n = 0 | n = 1 | n = 2 | n = 4 | n = 6 |
| m = 0 | — | $6.209 \times 10^{-3}$ | $1.735 \times 10^{-2}$ | $4.307 \times 10^{-6}$ | $1.194 \times 10^{-9}$ |
| m = 2 | 0.000 | $1.218 \times 10^{-7}$ | $-4.888 \times 10^{-7}$ | $-3.094 \times 10^{-10}$ | 0.000 |
| m = 4 | $1.162 \times 10^{-7}$ | $-5.644 \times 10^{-11}$ | $1.158 \times 10^{-11}$ | 0.000 | 0.000 |
| m = 6 | $-9.586 \times 10^{-12}$ | 0.000 | 0.000 | 0.000 | 0.000 |
| m = 8 | $5.348 \times 10^{-16}$ | 0.000 | 0.000 | 0.000 | 0.000 |

It should be noted that, in the main scanning direction, the aspherical coefficients of odd order (m=1, 3, 5, . . . ) are zero, and thus not indicated in TABLE 3. In such a configuration, the shape of the surface #5 in the main scanning direction is symmetrical with respect to the origin. In the auxiliary scanning direction, the coefficients of the odd order except be scanned along the main scanning plane, is shown. In FIG. 10, an optical path corresponding to the beam L1 (or L4) along the auxiliary scanning plane is shown. It should be noted that the optical paths of the beams L1 and L4 are symmetrical with respect to the main scanning plane P1. Therefore, one optical path is indicated in FIG. 10 and the other is omitted. In FIG. 11, an optical path corresponding to the beam L2 (or L3) along the auxiliary scanning plane is shown. It should be noted that the optical paths of the beams L2 and L3 are symmetrical with respect to the main scanning plane P1. Therefore, one optical path is indicated in FIG. 11 and the other is omitted. In these figures, the mirrors 6 (6y, 6m, 6c and 6b) and 7 (7y, 7m, 7c and 7b) are omitted and the optical paths from the front lens group 11 to the rear lenses 12y, 12m, 12c and 12b are indicated as developed.

The front lens group 11 includes first and second lenses 11a and 11b, which are similar to those employed in the first embodiment.

Table 4 shows numerical structure of the scanning optical system shown in FIGS. 9–11. The symbols and meaning thereof, various conditions are similar to those of the first embodiment.

TABLE 4

| Surface | r | d (IN/OUT) | n | Ld (IN/OUT) |
|---|---|---|---|---|
| #1 | −72.40 | 5.0 | 1.4862 | |
| #2 | −66.00 | 2.0 | — | |
| #3 | inf. | 10.0 | 1.5107 | |
| #4 | −121.40 | 105.4/108.0 | — | |
| #5 | −817.40 | 5.0 | 1.4862 | 2.06/6.08 |
| #6 | −1171.00 | — | — | |

α = 80°
β1 = 1.15°
β2 = 3.46°
Shifting amount (IN) = 0.6
Shifting amount (OUT) = 2.0

Surfaces #1 and #2 are the surfaces of the first lens 11a, and surfaces #3 and #4 are surfaces of the second lens 11b of the front lens group 11. Surfaces #5 and #6 represents the rear lens 12.

As afore-mentioned, the lens 11a (i.e., surfaces #1 and #2) and the lens 11b (i.e., surfaces #3 and #4) are similar to those employed in the first embodiment, and therefore, the aspherical coefficients $A_4$, $A_6$ and $A_8$ are identical to those shown in TABLE 2.

As afore-mentioned, surface #5 is expressed by SAG amount X(Y, Z) representing a distance from a point, whose two-dimensional coordinates are Y (main scanning direction) and Z (auxiliary scanning direction), on the surface to a reference plane tangential to the surface.

The values of the aspherical coefficients B(m, n) are shown in TABLE 5. The conical coefficient K of the surface #5 is 0.000.

FIGS. 13A and 13B show the fθ error and the bow, respectively, corresponding to the laser beams L2 and L3. As understood from FIGS. 13A and 13B, for the laser beams L2 and L3, the aberrations are well compensated for.

Third Embodiment

According to the third embodiment, the rear lenses 12m and 12c are designed independently of the design of the rear lenses 12y and 12b. That is, the rear lenses 12m and 12c are designed appropriately for the beams L2 and L3, while the rear lenses 12y and 12b are designed appropriately for the beams L1 and L4. Since the structure as developed appears similarly to that shown in FIGS. 4–6 or FIGS. 9–11, developed views of the third embodiment will be omitted.

Table 6 shows numerical structure of the scanning optical system according to the third embodiment. The symbols and meaning thereof, various conditions are similar to those of the first embodiment.

TABLE 6

| Surface | r | d (IN/OUT) | n | Ld (IN/OUT) |
|---|---|---|---|---|
| #1 | −72.40 | 5.0 | 1.4862 | |
| #2 | −66.00 | 2.0 | — | |
| #3 | inf. | 10.0 | 1.5107 | |
| #4 | −121.40 | 108.0 | — | |
| #5 (IN) | −756.70 | 5.0 | 1.4862 | 2.11 |
| #6 (IN) | −1045.70 | — | — | — |
| #5 (OUT) | −817.40 | 5.0 | 1.4862 | 6.08 |
| #6 (OUT) | −1171.00 | — | — | — |

α = 80°
β1 = 1.15°
β2 = 3.46°
Shifting amount (IN) = 0.6
Shifting amount (OUT) = 2.0

Surfaces #1 and #2 are the surfaces of the first lens 11a, and surfaces #3 and #4 are surfaces of the second lens 11b of the front lens group 11. Surfaces #5 and #6 represent the rear lens 12.

As afore-mentioned, the lens 11a (I.e., surfaces #1 and #2) and the lens 11b (i.e., surfaces #3 and #4) are similar to those employed in the first embodiment, and therefore, the aspherical coefficients $A_4$, $A_6$ and $A_8$ are identical to those shown in TABLE 2.

As afore-mentioned, surface #5 is expressed by SAG amount X(Y, Z) representing a distance from a point, whose two-dimensional coordinates are Y (main scanning direction) and Z (auxiliary scanning direction), on the surface to a reference plane tangential to the surface.

The values of the aspherical coefficients B(m, n) for the surface #5 of the rear lenses 12m and 12c corresponding to

TABLE 5

| | n | | | | |
|---|---|---|---|---|---|
| m | n = 0 | n = 1 | n = 2 | n = 4 | n = 6 |
| m = 0 | — | $1.950 \times 10^{-2}$ | $1.713 \times 10^{-2}$ | $4.244 \times 10^{-6}$ | $1.194 \times 10^{-9}$ |
| m = 2 | 0.000 | $3.148 \times 10^{-7}$ | $-5.098 \times 10^{-7}$ | $-3.703 \times 10^{-10}$ | 0.000 |
| m = 4 | $1.282 \times 10^{-7}$ | $-1.600 \times 10^{-10}$ | $1.642 \times 10^{-11}$ | 0.000 | 0.000 |
| m = 6 | $-9.157 \times 10^{-12}$ | 0.000 | 0.000 | 0.000 | 0.000 |
| m = 8 | $5.189 \times 10^{-16}$ | 0.000 | 0.000 | 0.000 | 0.000 |

FIGS. 12A and 12B are graphs showing characteristics of the scanning optical system according to the second embodiment for the laser beams L1 and L4. FIG. 12A shows an fθ error, and FIG. 12B shows the bow. As shown in FIGS. 12A and 12B, the aberrations are well compensated for.

laser beams L2 and L3 are identical to those shown in TABLE 3. The values of the aspherical coefficients B(m, n) for the surface #5 of the rear lenses 12y and 12b corresponding to laser beams L1 and L4 are identical to those shown in TABLE 5.

With this configuration, the fθ error and the bow according to the third embodiment are the same as those shown in FIGS. 7A, 7B, 12A and 12B. Accordingly, the aberrations are well compensated for.

As described above, according to the scanning optical device, there are two angles (β1 and β2) at which the beams are inclined with respect to the main scanning plane P1. If two types of rear lenses are provided as in the third embodiment, the aberrations are well compensated on each surface to be scanned. Further, each of the rear lenses are designed in accordance with the angle with respect to the optical axis of the front lens group 11. Accordingly, in comparison with the conventional system, the width of each of the rear lenses need not be so wide as in the conventional lens, thereby the manufacturing cost of the optical system can be well suppressed.

Even if the angles at which laser beams incline with respect to the main scanning plane include three or more angles, rear lens group may be designed for each of the beams (angles) so that the aberrations can be well compensated.

If the scanning optical system is configured such that a plurality of laser beams (e.g., laser beams L1–L4) travel symmetrically with respect to the main scanning plane P1, and the surfaces of the front lens group 11 are symmetrical with respect to the main scanning plane P1, the angles at which the laser beams L1 and L4 enter the rear lens group 12 have the same absolute value. Accordingly, the corresponding rear lens groups 12y and 12b can be formed as the lenses having the same shape. Similarly, the angles at which the laser beams L2 and L3 enter the rear lens group 12 have the same absolute value, and the corresponding rear lens groups 12m and 12c can be formed as the lenses having the same shape. Thus, if the scanning optical system is configured in such a fashion, the manufacturing cost can be suppressed.

By designing the scanning optical system such that the four laser beam intersect with each other at a point in the vicinity of a reflection surface of the polygonal mirror, the width, in the auxiliary scanning direction, of the polygonal mirror can be well reduced. Thus, the manufacturing cost of the polygonal mirror can be reduced. Further, since the polygonal mirror can be made thin, because of its light weight, torque of a motor for rotating the polygonal mirror need not be so strong.

As in the first and second embodiments, all the rear lenses are formed to have surfaces expressed by the same mathematical expression, and by varying the shifting amounts of reference axes with respect to the centers of the shapes in accordance with the angles at which the beams are inclined with respect to the optical axis of the front lens group, the aberrations can be suppressed. In a particular case, portions of a single lens may be used for such a purpose. FIGS. 14A–14C shows an example of such a case. That is, a portion A of a single lens (see FIG. 14A) is used as the rear lens 12m and 12c, which correspond to the beams L2 and L3 (see FIG. 14B), and a portion B is used as the rear lens 12y and 12b, which correspond to the beams L1 and L4 (see FIG. 14C).

In the above description, the scanning optical system used for scanning four beams corresponding to yellow, magenta, cyan and black components are explained. However, the invention is not limited to such a configuration, and can be applicable to a scanning optical system for three beams (e.g., yellow, magenta and cyan). In such a case, the central beam may be directed along the main scanning plane, and the other two beams may be directed symmetrically with respect to the main scanning plane.

The present disclosure relates to the subject matter contained in Japanese Patent Application No. 2001-186887, filed on Jun. 20, 2001, which is expressly incorporated herein by reference in its entirety.

What is claimed is:

1. A scanning optical system that emits a plurality of beams to a plurality of surfaces to be scanned, respectively, comprising:

a light source that emits a plurality of beams;

a polygonal mirror that is rotated to deflect the plurality of beams simultaneously to scan in a main scanning direction, the plurality of beams incident on said polygonal mirror being inclined with respect to each other in an auxiliary scanning direction which is perpendicular to the main scanning direction;

an imaging optical system that converges the plurality of beams deflected by said polygonal mirror on the plurality of surfaces to be scanned, respectively, said imaging optical system including a front lens group and a plurality of rear lens groups, all the beams deflected by said polygonal mirror being incident on said front lens group, the plurality of beams passed through said front lens group respectively pass through said plurality of rear lens groups, each of said plurality of rear lens groups being configured to have a shape which is designed in accordance with an angle of a beam incident thereon with respect to an optical axis of said front lens group, wherein each of said plurality of rear lens groups has at least one refraction surface which is expressed by a predetermined mathematical expression, each of said plurality of rear lens groups being configured such that a reference axis of the at least one refraction surface is displaced with respect to a center of a shape of the at least one refraction surface so that shifting amounts of positions where the beams incident on the respective at least one refraction surfaces of said plurality of rear lens groups with respect to the reference axes of the refraction surfaces are different from each other.

2. The scanning optical system according to claim 1, wherein said plurality of rear lens groups are configured such that the shifting amounts are greater as the angles of the incident beams with respect to said front lens group are greater, respectively.

3. A scanning optical system that emits a plurality of beams to a plurality of surfaces to be scanned, respectively, comprising:

a light source that emits a plurality of beams;

a polygonal mirror that is rotated to deflect the plurality of beams simultaneously to scan in a main scanning direction, the plurality of beams incident on said polygonal mirror being inclined with respect to each other in an auxiliary scanning direction which is perpendicular to the main scanning direction;

an imaging optical system that converges the plurality of beams deflected by said polygonal mirror on the plurality of surfaces to be scanned, respectively, said imaging optical system including a front lens group and a plurality of rear lens groups, all the beams deflected by said polygonal mirror being incident on said front lens group, the plurality of beams passed through said front lens group respectively pass through said plurality of rear lens groups, each of said plurality of rear lens groups being configured to have a shape which is designed in accordance with an angle of a beam incident thereon with respect to an optical axis of said front lens group, wherein each of said plurality of rear lens groups has at least one refraction surface, the respective at least one refraction surfaces of said plurality of rear lens groups being expressed by different mathematical expressions which are determined in accordance with angles of the incident beams with respect to an optical axis of said front lens group, respectively.

4. A scanning optical system that emits a plurality of beams to a plurality of surfaces to be scanned, respectively, comprising:

a light source that emits a plurality of beams;

a polygonal mirror that is rotated to deflect the plurality of beams simultaneously to scan in a main scanning direction, the plurality of beams incident on said polygonal mirror being inclined with respect to each other in an auxiliary scanning direction which is perpendicular to the main scanning direction;

an imaging optical system that converges the plurality of beams deflected by said polygonal mirror on the plurality of surfaces to be scanned, respectively, said imaging optical system including a front lens group and a plurality of rear lens groups, all the beams deflected by said polygonal mirror being incident on said front lens group, the plurality of beams passed through said front lens group respectively pass through said plurality of rear lens groups, each of said plurality of rear lens groups being configured to have a shape which is designed in accordance with an angle of a beam incident thereon with respect to an optical axis of said front lens group, wherein the plurality of beams incident on said polygonal mirror intersect with each other at a point in the vicinity of a reflection surface of said polygonal mirror, wherein said front lens group is arranged such that an optical axis thereof is parallel with a plane perpendicular to a rotation axis of said polygonal mirror, the optical axis of said front lens group passing the point at which the plurality of beams intersect with each other, each of refraction surfaces of said front lens group being symmetrical with respect to a main scanning plane which is a plane including the optical axis of said front lens group and perpendicular to the rotation axis of said polygonal mirror, wherein said plurality of laser beams includes first and second laser beams, which are inclined with respect to the main scanning plane on one side thereof at different angles, and third and fourth laser beams, which are inclined with respect to the main scanning plane on the other side thereof at different angles, angles at which said first and fourth laser beams incline with respect to the main scanning plane having the same absolute values, angles at which said second and third laser beams incline with respect to the main scanning plane having the same absolute values.

5. The scanning optical system according to claim 4, wherein two of said plurality of rear lens groups on which said first and fourth laser beams are incident have the same shapes.

6. The scanning optical system according to claim 5, wherein two of said plurality of rear lens groups on which said second and third laser beams are incident have the same shapes.

7. A scanning optical system that emits a plurality of beams to a plurality of surfaces to be scanned, respectively, comprising:

a light source that emits a plurality of beams;

a polygonal mirror that is rotated to deflect the plurality of beams simultaneously to scan in a main scanning direction, the plurality of beams incident on said polygonal mirror being inclined with respect to each other in an auxiliary scanning direction which is perpendicular to the main scanning direction;

an imaging optical system that converges the plurality of beams deflected by said polygonal mirror on the plurality of surfaces to be scanned, respectively, said imaging optical system including a front lens group and a plurality of rear lens groups, all the beams deflected by said polygonal mirror being incident on said front lens group, the plurality of beams passed through said front lens group respectively pass through said plurality of rear lens groups, each of said plurality of rear lens groups being configured to have a shape which is designed in accordance with an angle of a beam incident thereon with respect to an optical axis of said front lens group, wherein the plurality of beams incident on said polygonal mirror intersect with each other at a point in the vicinity of a reflection surface of said polygonal mirror, wherein said front lens group is arranged such that an optical axis thereof is parallel with a plane perpendicular to a rotation axis of said polygonal mirror, the optical axis of said front lens group passing the point at which the plurality of beams intersect with each other, each of refraction surfaces of said front lens group being symmetrical with respect to a main scanning plane which is a plane including the optical axis of said front lens group and perpendicular to the rotation axis of said polygonal mirror, wherein each of the plurality of laser beams incident on said polygonal mirror is inclined with respect to the optical axis of said front lens group when projected on said main scanning plane.

8. A scanning optical system that emits a plurality of beams to a plurality of surfaces to be scanned, respectively, comprising:

a light source that emits a plurality of beams;

a polygonal mirror that is rotated to deflect the plurality of beams simultaneously to scan in a main scanning direction, the plurality of beams incident on said polygonal mirror being inclined with respect to each other in an auxiliary scanning direction which is perpendicular to the main scanning direction;

an imaging optical system that converges the plurality of beams deflected by said polygonal mirror on the plurality of surfaces to be scanned, respectively, said imaging optical system including a front lens group and a plurality of rear lens groups, all the beams deflected by said polygonal mirror being incident on said front lens group, the plurality of beams passed through said front lens group respectively pass through said plurality of rear lens groups, each of said plurality of rear lens groups being configured to have a shape which is designed in accordance with an angle of a beam incident thereon with respect to an optical axis of said front lens group, wherein said plurality of rear lens groups have different shapes.

9. The scanning optical system according to claim 8, wherein each of said plurality of rear lens groups is an anamorphic optical system having a stronger positive power in the auxiliary scanning direction than in the main scanning direction.

* * * * *